United States Patent [19]
Dunn et al.

[11] Patent Number: 5,742,598
[45] Date of Patent: Apr. 21, 1998

[54] NETWORK FOR EFFICIENTLY LOCATING RESOURCES AND ROUTING SERVICE REQUESTS RECEIVED FROM INDIVIDUAL NODE CONNECTIONS

[75] Inventors: James M. Dunn, OceanRidge, Fla.;
Colin G. Harrison, Brookfield, Conn.;
David W. Levine, Peekskill, N.Y.;
Edith H. Stern, Boca Raton, Fla.

[73] Assignee: International Business Machines Corp., Armonk, N.Y.

[21] Appl. No.: 545,491

[22] Filed: Oct. 19, 1995

[51] Int. Cl.$^6$ .................................................. H04J 3/24
[52] U.S. Cl. ...................................... 370/393; 455/54.2
[58] Field of Search ............................... 370/92, 85.15, 370/17, 110.1, 94.1, 94.2, 60, 60.1, 95.1, 95.2, 95.3, 85.8, 85.3, 85.2, 16, 91, 93, 104.1, 105.1, 105.2, 13, 389, 404, 403, 402, 406, 445, 447, 449, 241, 522, 525, 428, 352, 393; 379/59–61; 455/56.1, 33.1, 54.1, 53.1, 54.2, 57.1, 58.1, 341, 99, 100, 67.1, 32.1; 340/825.08, 825.22; 371/34; 375/356; 395/829, 200.15, 200.09, 200.04, 859, 857, 856, 410, 412, 415, 418

[56] References Cited

U.S. PATENT DOCUMENTS

| | | | |
|---|---|---|---|
| 5,323,393 | 6/1994 | Barrett et al. | 370/85.8 |
| 5,457,680 | 10/1995 | Kamm et al. | 455/56.1 |
| 5,465,397 | 11/1995 | Pickert | 455/56.1 |
| 5,493,696 | 2/1996 | Wolf | 455/56.1 |
| 5,539,744 | 7/1996 | Chu et al. | 370/397 |

*Primary Examiner*—Dang Ton
*Attorney, Agent, or Firm*—George E. Grosser

[57] ABSTRACT

Network which accepts connections from a subscriber unit for service by a service provider. A plurality of nodes on the network are connected to different servers which provide the identical service. A subscriber unit's request for service is handled by the nearest node. A translation table is accessed by the LSO of the node to obtain the address of the nearest server based on a fuzzy address received as part of the request for service. The LSO of the node returns complete address data to the requesting subscriber unit for the nearest server capable of serving the request. The subscriber unit then issues a request for connection to the server using the acquired address information. The LSO of the receiving node creates a connection between a requesting subscriber unit and the addressed server.

15 Claims, 5 Drawing Sheets

NETWORK FOR EFFICIENTLY LOCATING RESOURCES AND ROUTING SERVICE REQUESTS RECEIVED FROM INDIVIDUAL NODE CONNECTIONS

The present invention relates to a network for providing data services to clients which connect to nodes of the network. Specifically a network which includes a plurality of nodes individually accessed by fixed or mobile units provides for efficient routing of a request for service to an available resource.

A category of services is emerging in the telecommunication industry that addresses the needs of subscribers who may move geographically from one location to another. The most popular of these services include the cellular telephone service which permits a cellular telephone subscriber to access a public switched network from any location within the cellular network. Additionally there are data services now available for permitting subscribers to access via a radio link, either the cellular telephone network or a CDPD network which is connected via a backbone to the cellular telephone network, public switched telephone network, and to other networks. As the networking of these various services continues to grow, users will be able to access each other via voice communications, data communications, e-mail, telefax, as well as avail themselves of voice mail and other private electronic files.

The mobility of various users of these services requires intelligent and efficient routing of requests for service to the service provider. The available services may be accessed by routing all requests received at every node to a central location supporting the requested service.

The routing of every request for service received by the network to a single location may not, however, be efficient and may cause traffic bottlenecks for the service provider. A contrary solution to the problem is to locate the identical service at each node location. This approach, however, incurs the expense of service duplication at each of the nodes.

The foregoing issues are complicated by portable telecommunications services such as cellular telephone, which have users who effectively change node connections as they move from cell to cell. In the event a user is in the middle of a transaction with a service provider, and the user moves from one cell to another, the second cell must not only establish communications with the user, but route the user to the service location which had been previously engaged in communication with the user.

In the current cellular telephone environment, networks using the internet protocol route messages from source to destination using a formal name. This name may be in the form of four serially connected components such as A, B, C, and D. The network routes the messages through the use of router machines which create a more detailed path description from the name. The initial part of the name specifies a unique major network name, the following part specifies a unique subnet within the major network, and the final part identifies the destination location. As the user moves from cell to cell, the address may no longer be valid to a new receiving node, because addresses may only be associated with a given node or network, and unknown to other connected nodes or networks. This may result in an undeliverable message being received at the node connection.

In the case of a mobile subscriber unit, several methods have been proposed to solve the problem of incomplete addressing. These techniques require that the mobile unit report changes in its address, using a router to keep a forwarding address, or establishing a pseudo presence at the normal home location corresponding to the cell in which the mobile unit is registered, resulting in numerous forwarded messages and files being transferred across the network.

SUMMARY OF THE INVENTION

It is an object of this invention to provide data communications with a single data provider from a plurality of nodes of a network.

It is a more specific object of this invention to efficiently connect nodes of a network to a service provider.

It is a further object of this invention to route requests for service received from a subscriber to one of a plurality of service providers based on the location of the node receiving the request.

It is another object of this invention to provide for seamless connectivity for mobile data users who change positions within a cellular network during a data session with a data service provider.

These and other objects are provided by an apparatus and method in accordance with the invention. A network node accepts a connection request from a subscriber unit, and connects the subscriber unit to a data service provider. If the subscriber unit changes connection nodes during a data session with a service which is provided through the network, the network node closest to the subscriber unit accepts a subsequent request for connection issued by a subscriber unit which has moved from one location to another.

The network includes a plurality of servers, which provide the same data service to the subscriber units. Each node which accepts a connection from a subscriber unit previously engaged in a data session with a server will determine the most efficient routing to an available server, and transfer the subscriber unit service request to the selected server.

The apparatus and method in accordance with a preferred embodiment of the invention provides for the use of fuzzy addresses to identify services for connection to a mobile subscriber unit. A mobile subscriber unit may identify to the network node the service desired by the fuzzy address, and the specific address for a server to provide the service is obtained from an address table accessible by the node. The address is subsequently transferred to the mobile subscriber. A subsequent request for service by the mobile subscriber unit using the address data connects the subscriber to the server location which has been previously selected from the address table based on global network efficiency considerations.

Each of the nodes of the network may include a profile for each mobile user to authenticate the user before granting access to the server. The addition of services to the network as well as control over the routing of connections to the servers may be administered by one or more regional service points which control respective nodes of the network.

DESCRIPTION OF THE PREFERRED EMBODIMENT

Figure 1:
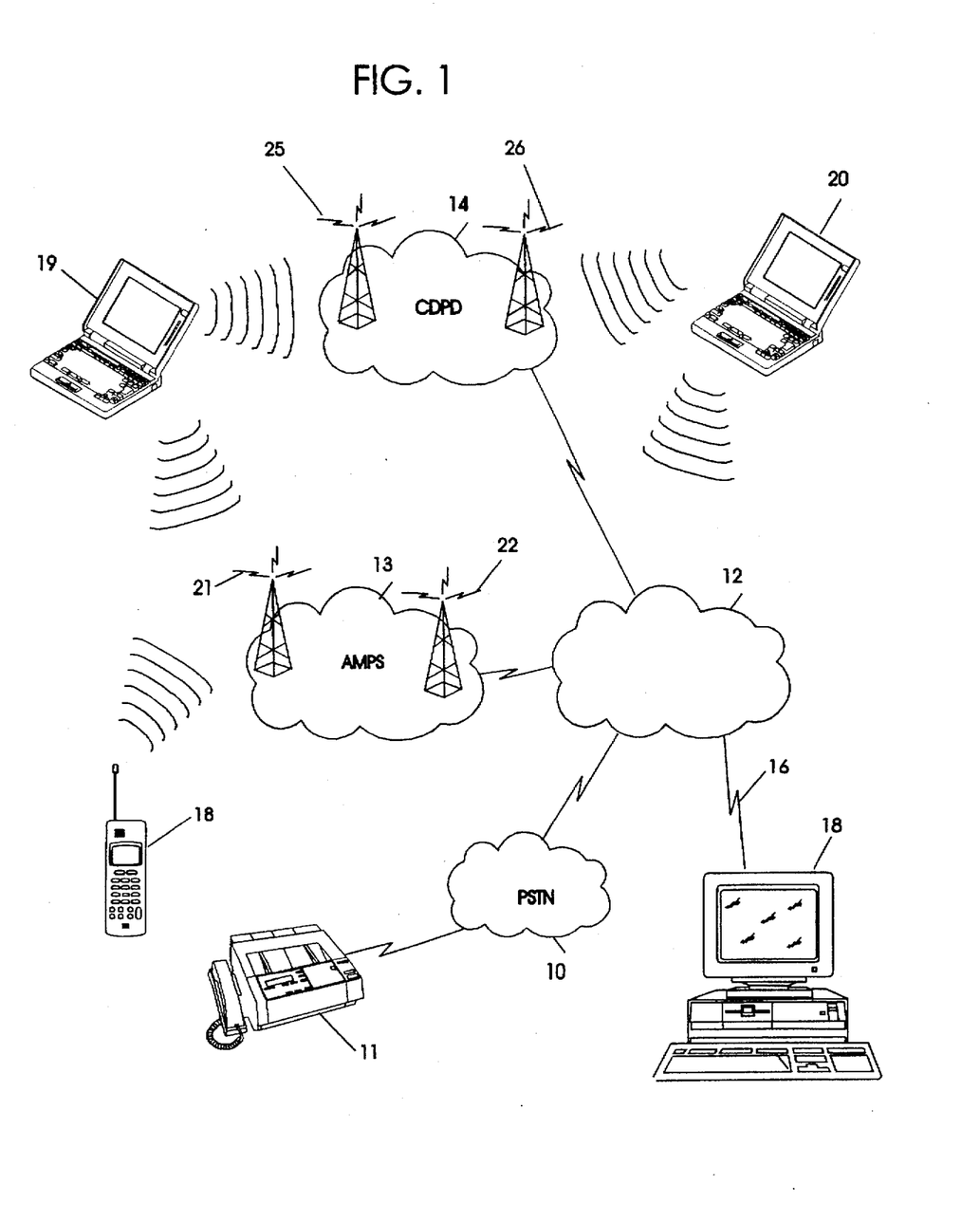
FIG. 1 is a general illustration of diverse communication services which are networked together.

FIG. 1 illustrates a network configuration for providing a plurality of communication services. The network includes the public switched telephone network 10 for conventional voice and modem communications, linked via a common global intelligent network 12 to various other subnetworks 13 and 14, as well as to a work station facility 18 via a trunk 16. The various services represented by the subnetworks 10, 13, 14, and dedicated trunk 16 are integrated in a single network. The subnetwork 13 is a cellular telephone network which includes a plurality of cells, two of which are represented as 21 and 22. Cellular communications are provided by a radio frequency link between the cellular telephone 18 and one of the cells 21 and 22. As is conventional in cellular telephony, the connection between the cellular phone 18 and cellular network 13 changes as the cellular phone moves between an area served by cell 21 and an area served by cell 22.

Additionally, CDPD network 14 is shown which includes digital communication devices 19 and 20 which also communicate over a cellular network.

Gateways or trunk connections are provided between each of the networks 13, 14, and 10 and a global intelligent network 12.

The data applications represented by wireless data terminals 19 and 20 may communicate with various services connected to either the global intelligent network 12 or the individual subnetworks 13 and 14. For instance, a news retrieval service or e-mail service may be accessed by the users 19 and 20 from any locations served by cellular network 14.

Figure 2:
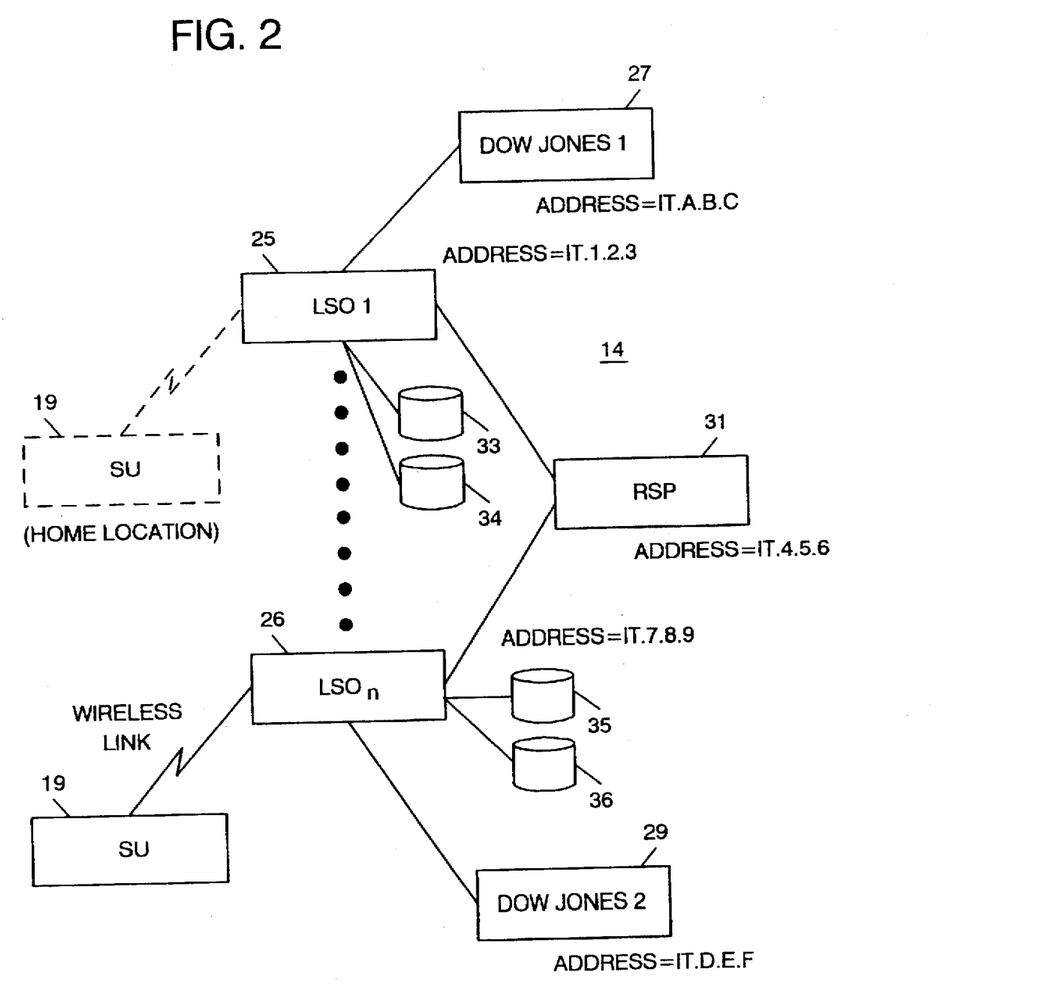
FIG. 2 illustrates in greater detail the cellular network of FIG. 1 with respect to a mobile subscriber change in geographic location.

The complication of servicing mobile users from all nodes within a network such as CDPD network 14 is illustrated in FIG. 2. FIG. 2 illustrates the home cell location having a node 25 with an $LSO_1$, (LOCAL SERVICE OFFICE) having an address IT.1.2.3, connected to the server 27 which has an address on the subnetwork 14 of IT.A.B.C.

Server 27 may be providing a news service such as a Dow Jones retrieval service, Washington Post, etc. Servers like subscriber units may also be linked to each node via an RF link. A subscriber unit receives service from these services without realizing how the server is linked to the node.

As a subscriber unit 19 moves from its home location to the adjacent cell of the cellular network, a wireless link is formed to the $LSO_n$ of node 26 of the next cellular location. The transition from connection to $LSO_1$ of node 25 and $LSO_n$ of node 26 requires that the node 26 reacquire access to the service provider 27, Dow Jones 1.

Cellular network 14 includes a regional service point 31 having an address IT.4.5.6 for controlling LSOs of nodes 25 and 26. The regional service point can make global changes to databases 33, 34, 35 and 36 at each LSO.

As shown in FIG. 2, multiple copies of the Dow Jones data service may be provided by multiple servers in the network 14. In this instance, the node 26 may route the request for service received from the subscriber unit 19 to the server 29, Dow Jones 2.

As part of the conventional cellular radio service, there is a seamless handoff from one LSO to another adjacent LSO. When the subscriber unit 19 enters the cellular area served by node 26, it begins a reacquire sequence by detecting the carrier from that cell, and then registering with the new LSO of node 26.

In the event that the SU 19 was engaged in a data transaction, such as a text retrieval from Dow Jones 27, the $LSO_n$ of node 26 will reroute the connection to the nearest server 29 having a copy of the Dow Jones service. The routing of the connection to server 29 is based on a table contained in the databases 35, 36 at the node 26, identifying the servers in order of priority, having the service for connection to the subscriber unit 19. These servers are prioritized to promote the most efficient use of the network 14 facilities. In the event that the connecting node 26 has its own copy of the service on a local server 29, then the most efficient routing is to server 29 having the local copy of the text retrieval service 29.

The table in databases 35, 36 identifying the address of the nearest server 29 may also be maintained at the regional service point 31. This will require an LSO of a node to inquire with the regional service point for the nearest server location and routing information.

The subscriber unit 19 may identify the text service by transmitting a fuzzy address, to the LSO. Each LSO in the network 14 will have a translation table, preferably obtained from the regional service point, and stored in a database 33, 34, 35 or 36 for translating the fuzzy address into a real network address of the nearest server for providing the service. The tables entries will be different for each node, depending principally on the location of the nearest server. The actual server address IT.D.E.F is obtained from the translation table and forwarded to the subscriber unit. A subsequent connection request made by the subscriber unit to the LSO using the address IT.D.E.F. connects the subscriber unit through the LSO of the node to the server. Thus, the subscriber is connected to the server 29 instead of a more distant server 27.

FIGS. 3, 4, 5 and 6 illustrate the steps carried out at both the subscriber unit 19 and $LSO_n$ of node 26 when the subscriber unit 19 enters the cellular area served by node 26. In the event that a data session was in progress, prior to entering the new cellular area, as determined by decision block 51 in step 53 initiates a transmission to register with the $LSO_n$ of node 26. If there was no prior session between the subscriber unit 19 and the $LSO_n$, the modem is enabled in step 52 and then a transmission is initiated in step 53 to register with the node of the new cellular area. The $LSO_n$ of node 26 responds, and other LSOs which may detect the transmission by subscriber unit 19 may also respond. If more than one cell responds in step 54, a decision is made in step 56 to determine which of the responding cells has the greatest signal strength.

Figure 3:
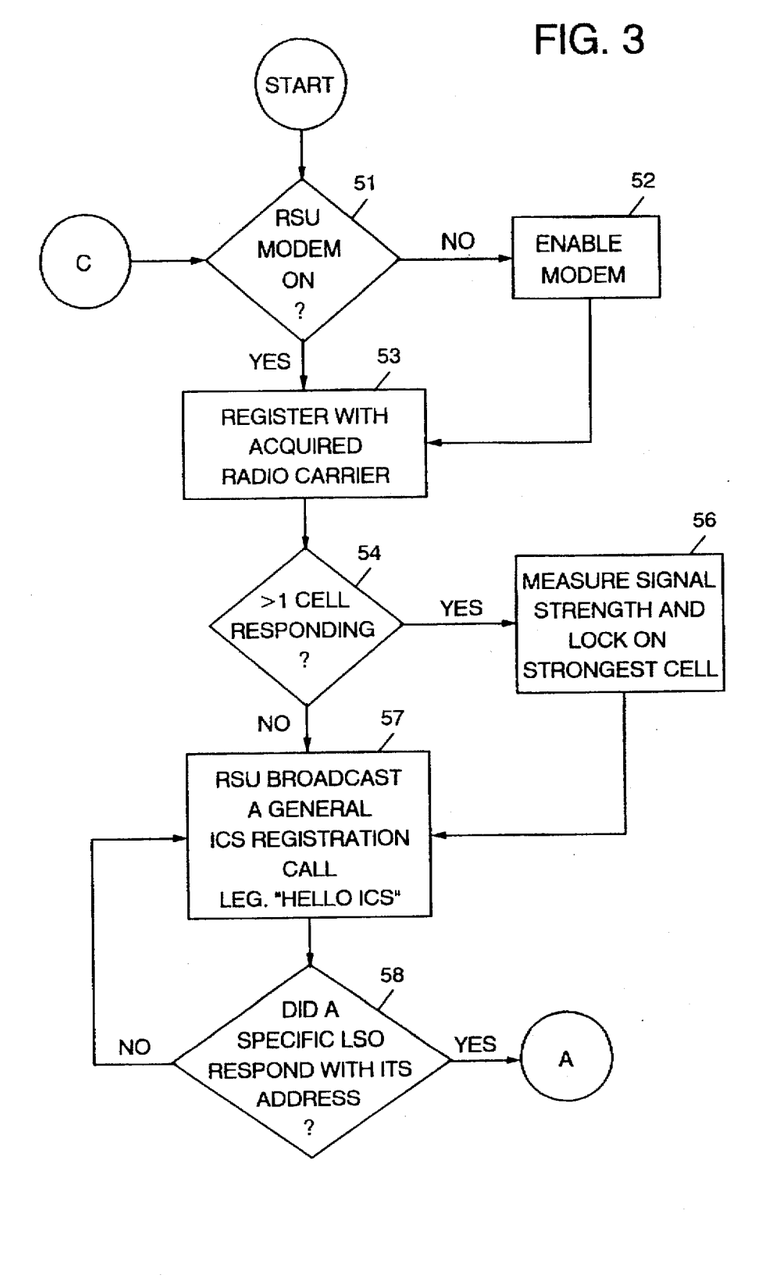
FIG. 3 illustrates the process for connecting a mobile subscriber unit to an adjacent node of the network after entering an adjacent cellular cell.

The subscriber unit 19 locks onto the stronger signal and broadcasts its registration information in step 57 to the $LSO_n$ of node 26. The registration call includes the identity of the mobile unit. The subscriber unit determines in decision block 58 if a specific LSO has responded with its address to the registration call.

Figure 4:
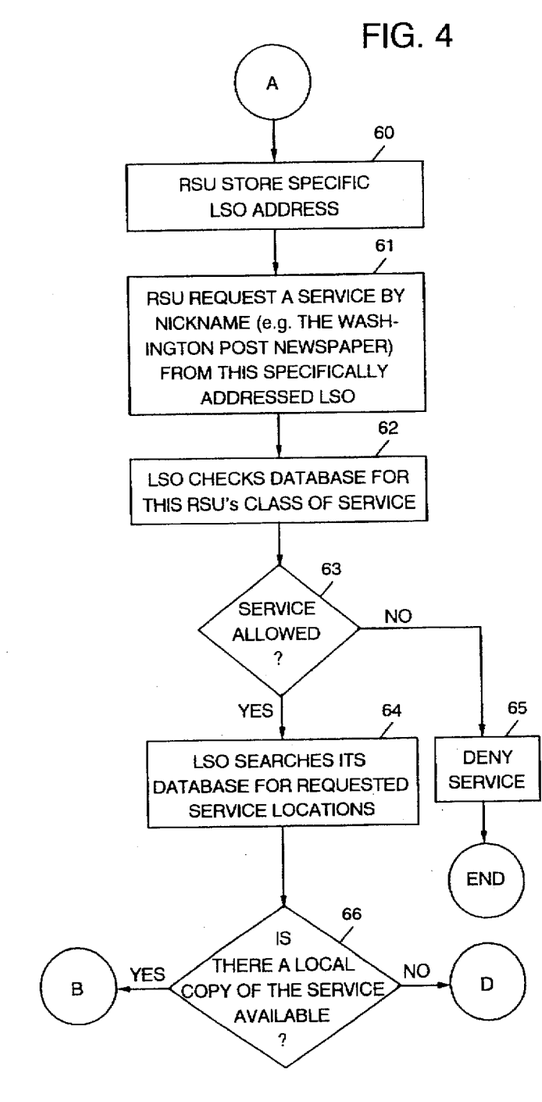
FIG. 4 illustrates the process executed by a remote subscriber unit to access the same data service after connecting to another node of an adjacent cell.

FIG. 4 illustrates the steps executed by the mobile subscribing unit 19 for requesting the continued Dow Jones service. The requesting subscriber unit (RSU) 19 stores the LSO address received from the $LSO_n$ of node 26 in step 60. The requesting subscriber unit 19 then requests the service by using a pseudoname, specifically addressed to the responding LSO in step 61. The receiving LSO checks its database 30 for the particular class of service requested in step 62, and if the service is authorized for the requesting subscriber unit, decision block 63 will initiate an authorization to the $LSO_n$ of node 26 to search its database for address information of a server to handle the request in step 64. In the event the service is not allowed for that particular subscriber unit, the subscriber is denied service in step 65.

Part of the process of determining location of the server to handle the request is a determination in step 66 that a local copy of the service, stored on a server, exists at the node location. In the event there is a copy of the service available at the node location, the execution shifts to step 69 of FIG. 5.

Figure 5:
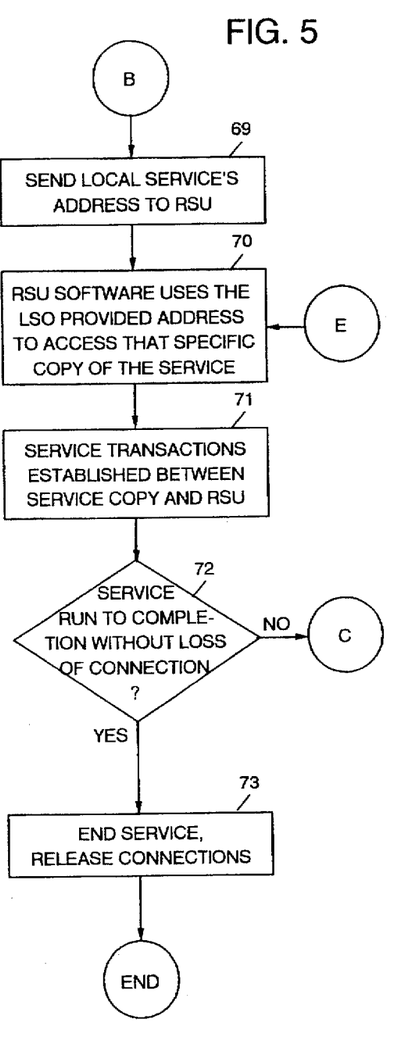
FIG. 5 illustrates the process carried out at an LSO of a node for responding to a user's request for connection.

Referring now to FIG. 5, step 69 sends the local service's address to the requesting subscriber unit. The requesting subscriber unit software uses this address in step 70 to access the specific copy of the service. The subscriber unit may then freely communicate with the server 29, via the LSO at node 26, using the provided address. A transaction is established in step 71 between the requesting subscriber unit 19 and the server 29 at the node 26.

During the data transaction between the subscribing unit 19 and server 29, a loss of connection may be experienced if the subscriber unit moves to another cellular location. In the event of this circumstance, control over the process returns to FIG. 3 and the subscriber unit once again registers its presence with the LSO of the present node.

Assuming there is no interruption of the service, the service completes in step 73. A tear down of the connection occurs when the server 29 at the node 26 recognizes that the whole text transmission is complete.

Figure 6:
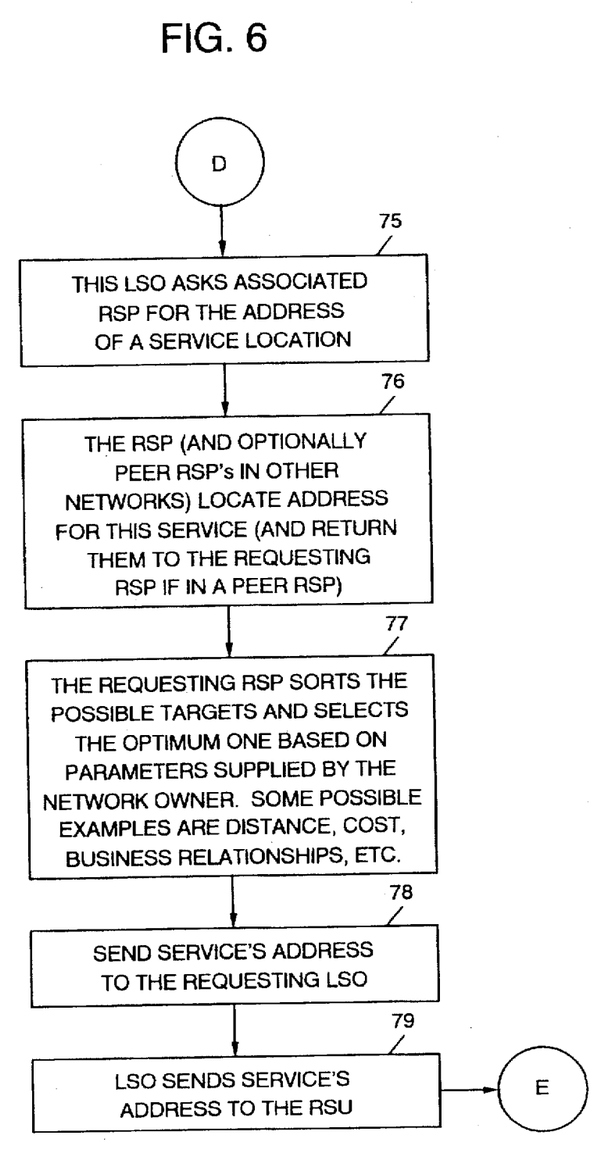
FIG. 6 illustrates the process for identifying the address of a service provider, and connecting a node in communication with a user to the service provider.

The network node 26 or other node responding to the subscriber unit, will complete the tasks represented by FIG. 6, when the receiving node 26 does not have a server for handling the request stored in a local table. In this scenario, the LSO, in step 75, may forward an inquiry to the regional service point 31 for the address of a service location. The regional service point 31 may issue other inquiries to other regional service points in the network for the address of the service, and return the address to the requesting node in step 76. The requesting regional service point 31 can then sort among the possible resources in step 77 for providing the requested service and select the optimum one, based upon parameters which take into account global network efficiency. These considerations may include the distance to the nearest resource, the cost of the transaction to a particular resource, business relationships between resource and the requesting node, etc.

Once the regional service point has made the required judgement, the selected address is forwarded to the requesting LSO of the node 26 in step 78. The requesting $LSO_n$ of the node 26 forwards the service address to the requesting service unit 19 in step 79. The requesting service unit now has all the information necessary to start a session with the server. The requesting service unit 19 then completes the process by returning to step 70 in FIG. 5 and initiating a session with the server using the address provided.

Thus, it is clear that in accordance with the foregoing, a subscriber unit which may be a cellular data terminal may initiate a session with a service provider in one cell, go to the adjacent cell and the network will efficiently reconnect the subscriber unit to the service. The foregoing system does not require duplication of services at every node, yet provides for the ability of routing a request to one of a plurality of service providers based on network efficiency.

As servers are added to network 14 they may be registered with each LSO of the network nodes. The servers also have the communications capability of a subscriber unit. Whether the connection is via a radio frequency link or through a hardwire connection to a specific node of the network, the process for registering the server to all the nodes of the network can be illustrated with respect to FIG. 7.

Figure 7:
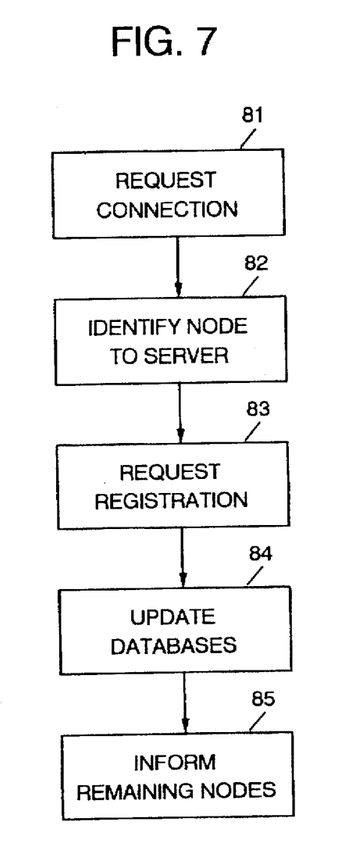
FIG. 7 illustrates the process of registering a server with the network.

Referring now to FIG. 7, the process for connecting the server to a network begins in step 81. A connection request is issued by the server to the network over a link connecting the server to the node. The node responding to the connection request will identify to the server the identity of the node receiving the request in step 82. The server then identifies to the node its identity and issues a request to the node to register the server to the network in step 83.

The databases contained at the connected node are updated in step 84 with the identity and routing information for the server, including an appropriate fuzzy address, so that future requests from subscriber units for service by the server can be handled using the database entries.

A node which successfully registers a server, in step 85, will forward the server registration information to the remaining nodes of the network for storage in databases of the remaining nodes. Further, the regional service point which manages the node is supplied with the server identity and other information contained through the registration process and stores the information.

Those skilled in the art will recognize yet other embodiments described by the claims which follow.

What is claimed is:

1. A network for establishing connections for a subscriber unit which initiates a request for access to a service available at multiple servers comprising:
  (a) a plurality of nodes connected to said network which are selected one at a time for supporting radio connection to the subscriber unit, each of said nodes having the capability of accepting said request for connection from said subscriber unit when it is the selected node to support such radio connection;
  (b) a plurality of servers, each server being linked via a network connection to a respective node for providing said service;
  (c) means at each node which when the node is selected for connection is responsive to said request for identifying an address of a particular server preselected for providing said service;
  (d) means at each node for transmitting said server address to said subscriber unit; and,
  (e) means at said node for initiating a connection between said node and said service location over said network, in response to receiving said request from said subscriber unit including said server address, whereby said subscriber unit is connected through said node to said service.

2. The network of claim 1, wherein said means for identifying contains address information for connecting said subscriber unit to a preselected server for providing said service.

3. The network of claim 1 further comprising a service point for managing a group of said nodes, said regional service point maintaining a database of services and their server address with respect to each node, said regional service points providing to each node updated data for identifying preferred server addresses for each said service.

4. The network of claim 1 wherein said subscriber unit is connected to a network node by a radio frequency link.

5. The network for claim 1 wherein each of said nodes have access to a stored profile of each subscriber unit eligible for connection to the network, and validates said subscriber unit for connection before connecting said server to said node.

6. A method for providing access to servers of a network by a subscriber unit comprising:

(a) initiating a request for access to said network, said request including the identity of a service to be accessed;

(b) responding to said request at a particular node of said network which is selected for establishing a radio connection considering geographic proximity to said subscriber unit;

(c) determining at said selected node the address of a preselected preferred server predefined respective of the node for providing said service to said subscriber unit; and (d) forming a link connection between said preselected preferred server and said subscriber unit.

7. The method for providing access to servers of a network according to claim 6 further comprising:

determining from a database accessible by said node the address of the preselected preferred server for said node for responding to said request so that a link connection is made to that preselected preferred server.

8. The method for providing access to servers according to claim 7 wherein said node determines from said request the identity of said subscriber unit and verifies from a table at said node that said subscriber unit is authorized to connect to said server.

9. The method for providing access to servers according to claim 6, wherein said nodes return to said subscriber unit an address of said server.

10. The method according to claim 9, wherein said subscriber unit establishes a session with said server using said address.

11. The method for providing access to servers according to claim 7 further comprising registering a server to said node as the preselected preferred server for providing a service comprising the additional steps of:

initiating a connection request from said server to said network over a link connecting said server to said node;

identifying to the server through said link the identity of said node;

identifying to said node through said link the identity of said preselected preferred server;

issuing to said node over said link a request to register said server to said network; and updating a database at said node with the identity and address of said preselected preferred server.

12. The method for providing access to servers according to claim 11 further comprising reporting each server registration received at said node to the remaining nodes of said network.

13. The method for providing access to servers according to claim 11 wherein a regional service point associated with said node said server identity to a node to which it is linked.

14. The method for providing access to servers according to claim 7 wherein said node returns to said subscriber unit a list of services from which said subscriber unit selects a service to be accessed.

15. The method for providing access to servers according to claim 14 further comprising initiating from said subscriber unit a request to connect to a server for providing a service identified in said list of services.

* * * * *

UNITED STATES PATENT AND TRADEMARK OFFICE
CERTIFICATE OF CORRECTION

PATENT NO. : 5,742,598  
DATED : April 21, 1998  
INVENTOR(S) : James M. Funn, Colin G. Harrison, David W. Levine, Edith H. Stern and James J. Toohey Page 1 of 1

It is certified that error appears in the above-identified patent and that said Letters Patent is hereby corrected as shown below:

Please show Applicants' names as:

Inventors: James M. Dunn, Ocean Ridge, Fla.;  
Colin G. Harrison, Brookfield, Conn.;  
David W. Levine, Peekskill, N.Y.;  
Edith H. Stern, Boca Raton, Fla.;  
James J. Toohey, Boca Raton, Fla.

Signed and Sealed this

Fourteenth Day of August, 2001

Attest:

Attesting Officer

NICHOLAS P. GODICI  
*Acting Director of the United States Patent and Trademark Office*